Aug. 29, 1961 L. S. GRAY 2,998,134
METHOD AND APPARATUS FOR MANUFACTURING GUMMED-TAPE ROLLS
Filed Jan. 26, 1959 5 Sheets-Sheet 1
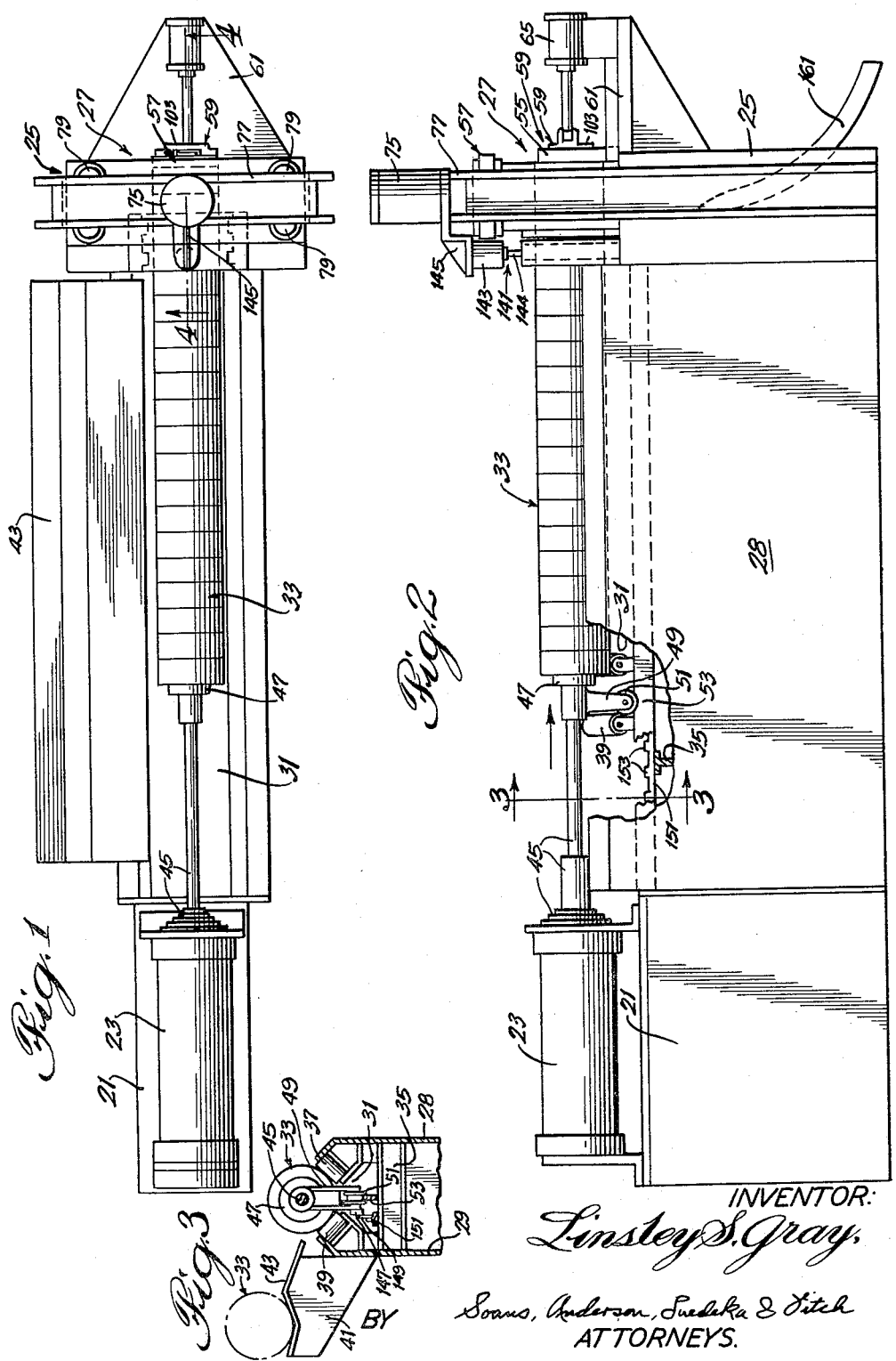
INVENTOR:
Linsley S. Gray,
BY Soans, Anderson, Sredeka & Fitch
ATTORNEYS.

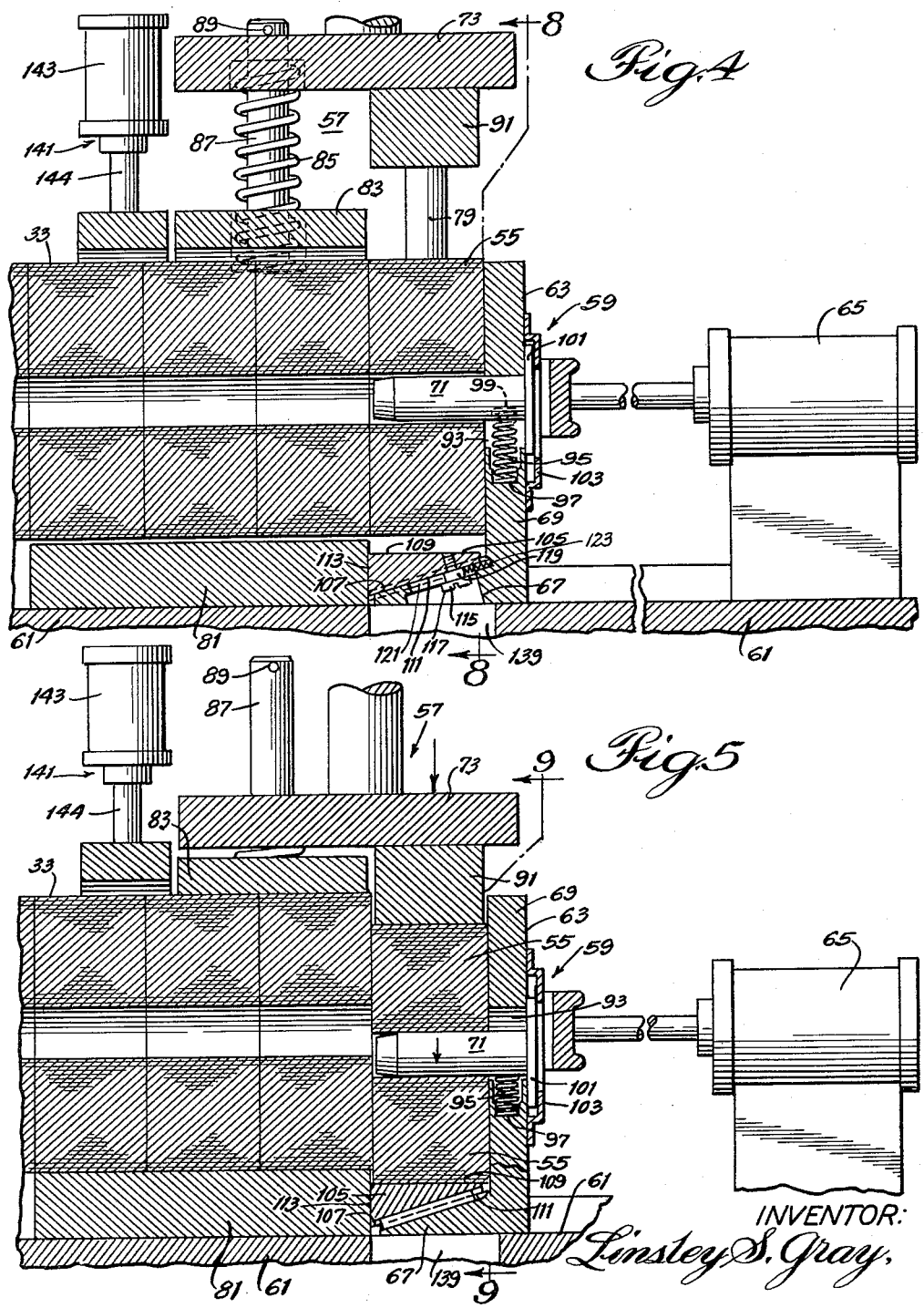

Aug. 29, 1961  L. S. GRAY  2,998,134
METHOD AND APPARATUS FOR MANUFACTURING GUMMED-TAPE ROLLS
Filed Jan. 26, 1959  5 Sheets-Sheet 3
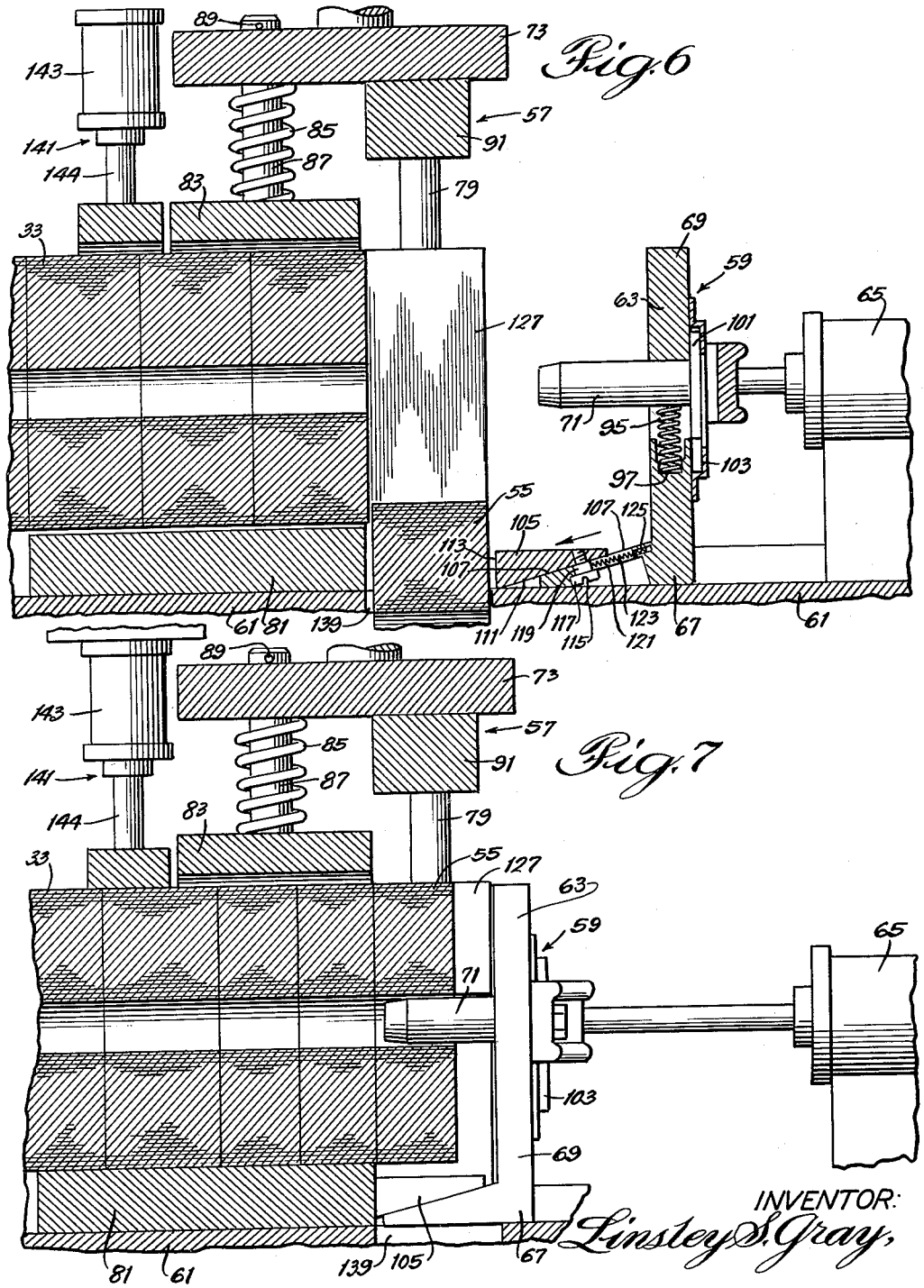
INVENTOR:
Linsley S. Gray,
BY Soans, Anderson, Luedeka & Fitch
ATTORNEYS.

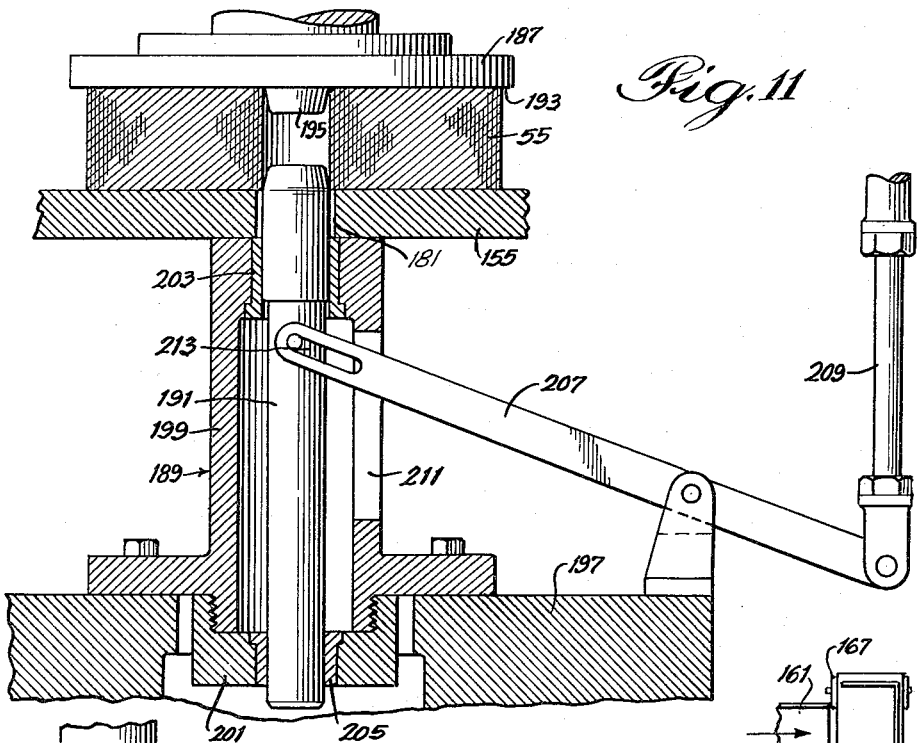
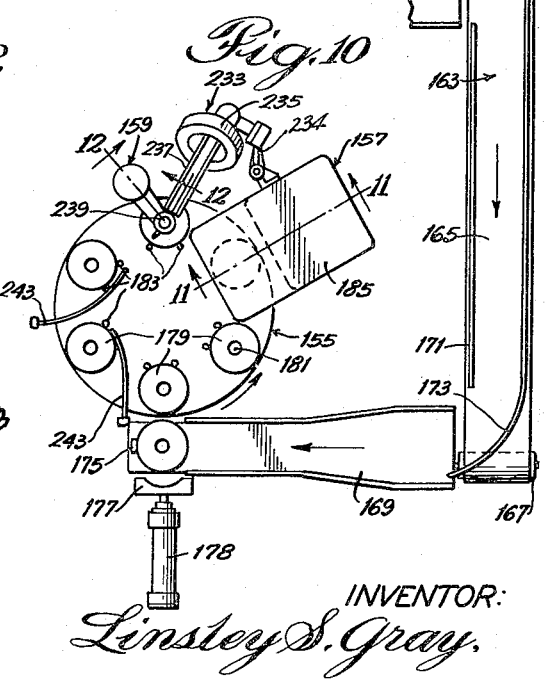
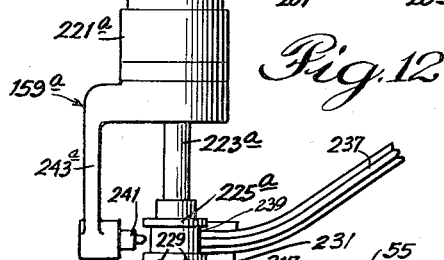
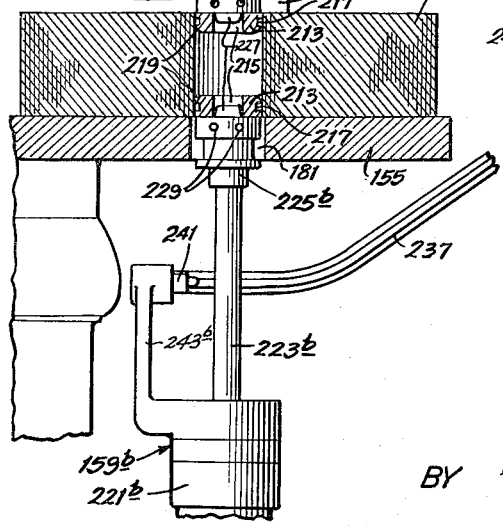
Fig. 10  Fig. 11  Fig. 12
INVENTOR:
Linsley S. Gray
BY Soans, Anderson, Luedeka & Fitch
ATTORNEYS.

the arrangement of the various operating components just after separation of the endmost roll from the log;

FIGURE 6 is a view similar to FIGURES 4 and 5, showing the roll separating components in fully retracted position and the separated roll being released from the apparatus;

FIGURE 7 is a view similar to FIGURE 5 illustrating the mode of operation of the equipment when the log is comprised of rolls of different widths;

FIGURE 10 is a top view of the core inserting portion of the gummed-tape roll handling equipment disclosed by this invention;

FIGURE 11 is an enlarged fragmentary view, partially in section, taken along the line 11—11 of FIGURE 10; and FIGURE 12 is an enlarged fragmentary view, partially in section, taken along the line 12—12 of FIGURE 10.

Figure 8:
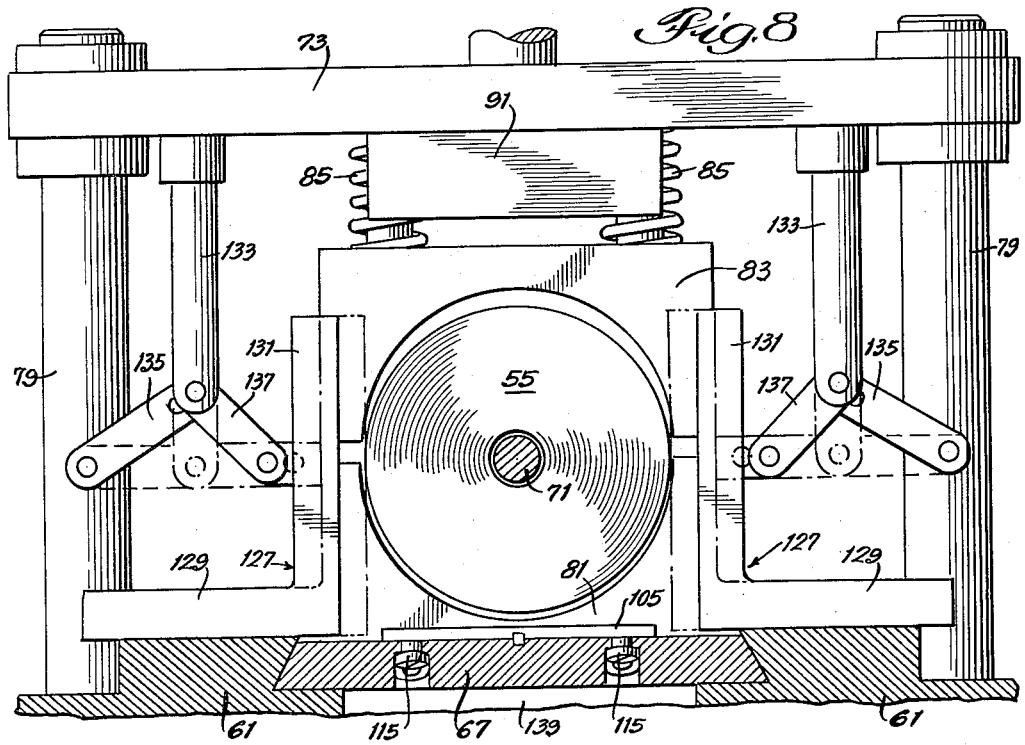
FIGURE 8 is a sectional view taken along the line 8—8 of FIGURE 4.

The manufacturing equipment shown generally in the drawings is designed to receive a log constituting a plurality of rolls of sheet material, such as gummed-tape rolls, and to perform various integrated and sequential operations on the log and on the rolls separated from the log to obtain a plurality of rolls of tape each having a plug inserted at each end of the central core. Although the various components of the equipment all act in cooperation to achieve the desired end product, for convenience in description and explanation, the overall equipment shall be considered to include a roll separating or log breaking portion, as shown generally in FIGURES 1, 2 and 3, and a core inserting portion, which is seen particularly in FIGURE 10, and which operates to size the roll core openings, to insert a plug in each end of the core openings and to sort the rolls for grouping in accordance with their thickness.

With the present invention, the log of rolled sheet material, as it is wound on the slitter-rewinder, is formed without the use of the usual cores. For example, it can be wound on an expandable mandrel that is collapsed and withdrawn after the completion of the rewinding operation. The log of tape material or the like is, therefore, devoid of any center core as it is placed in the machinery illustrating the present invention.

Considering first the log breaking or roll separating portion of the disclosed equipment, this portion as seen generally in FIGURES 1, 2 and 3, is carried on a base or frame including a supporting structure 21 carrying a log feeding cylinder 23, a second supporting structure 25 which is spaced from the first structure and which supports a roll separating mechanism 27, and a pair of skirt members 28 and 29 extending between and joined to the structures 21 and 25 to form a carriage or bed 31 along which a log 33 cradled thereon can be readily advanced by the log feeding cylinder 23 through the roll separating mechanism 27. In this respect, the skirt members are spaced one from the other by means of a series of cross braces 35, and each of the skirt members supports a series of spaced rollers 37 and 39 which are respectively arranged in a pair of downwardly converging, inclined planes to provide rolling support for the log during its incremental advance toward the roll separating mechanism.

Welded or otherwise fixedly attached to the rear of the skirt member 29 are several brackets 41 which support a loading apron 43 having a portion of dished cross section for receiving a roll-log from the previous rewinding operation. As can be observed from FIGURE 3, the carriage 31 can be readily loaded by manually initiating movement of a log from the dished section of the loading

United States Patent Office 2,998,134
Patented Aug. 29, 1961

2,998,134
METHOD AND APPARATUS FOR MANUFACTURING GUMMED-TAPE ROLLS
Linsley S. Gray, Aurora, Ill., assignor to Gray Stamping and Manufacturing Company, a corporation of Illinois
Filed Jan. 26, 1959, Ser. No. 789,130
13 Claims. (Cl. 209—90)

This invention relates generally to the manufacture of rolled sheet material, such as paper, and is more particularly directed to a method and apparatus for breaking a log of such rolls into its individual constituent rolls and for inserting core plugs into the separated rolls.

In the manufacture of paper rolls, such as rolls of gummed tape, it is generally common practice to wind or roll up a pre-slitted, adhesively treated sheet into a cylindrical log or stick having axial cores of prescribed length corresponding to the width of the separable rolls forming the log. Rewinding of a sheet into a log form acts to press the constituent rolls together along their edges as a result of the lateral movement of the sheet on the rewinder which effects an interleaving of the individual tape edges during the winding operation. In the case of adhesively treated sheets, the presence of the adhesive further contributes to the bonding together of adjacent rolls in the log. In the past, separation of the individual rolls which constitute the log has been an expensive and time consuming operation and has ordinarily been accomplished by manual striking of the endmost roll with a mallet or the like to effect severance of the bond between the rolls.

With the above described procedure, it is also necessary for the manufacturer to stock a variety of sizes and types of cores which may be of wood, paper, plastic or other suitable material. The prescribed cores are then selected and placed on a mandrel which is inserted into the slitter-rewinder machine in position for receiving the slit sheet material.

With this background in mind, the disclosed invention is intended to eliminate the need for various size and types of cores, to provide an integrated machine adapted to automatically separate the constituent rolls of a gummed-tape log and to handle the separated rolls for subsequent automatic sizing, core plug inserting, and sorting operations. Accordingly, the principal objects of this invention are the provision of a new and improved method and apparatus for handling individual rolls of sheet material which are initially manufactured in log form and for inserting core plugs into the central cores of such rolls. A further object of the invention is to provide apparatus of the type chaaracterized above which is reliable in operation and inexpensive to build and maintain.

Other objects and advantages of the invention will be understood by reference to the following description and accompanying drawings, wherein the novel manufacturing method is described and wherein there is described and illustrated one form of apparatus which is adapted to carry out the disclosed method and which is constructed in accordance with the present invention.

In the drawings:

FIGURE 1 is a top view of the log breaking portion of the gummed-tape roll handling equipment disclosed by this invention;

FIGURE 2 is a side view, partially broken away, of the apparatus shown in FIGURE 1;

FIGURE 3 is a view taken along the line 3—3 of FIGURE 2;

FIGURE 4 is an enlarged, fragmentary sectional view, taken along the line 4—4 of FIGURE 1 and showing the relation of the various operating components just prior to separation of the endmost roll from the log;

FIGURE 5 is a view similar to FIGURE 4, showing apron for travel down the apron and into the V-shaped carriage.

The log 33 is fed step-by-step along the carriage for successive positioning in the separating mechanism 27 by operation of the log feeding cylinder 23. While various types of arrangements can be employed, in this embodiment the cylinder is of the fluid pressure type, being either hydraulic or pneumatic, and is provided with an extensible, telescopic ram 45. The end of the ram 45 is provided with a pusher plate 47 which is formed for engagement with the adjacent end of the log, and which incorporates a leg 49 for supporting the extended end of the ram. In this connection, the leg has journalled thereon a roller 51 in supported engagement with a longitudinally extending track 53 fixed, as shown in FIGURE 3, on top of the cross braces 35 between the series of rollers 37 and 39.

As will be seen hereinafter, the advancing movement of the log is incremental, and in this regard, the log feed cylinder 23 is preferably provided with suitable means, such as a bypass or relief valve, for affording diversion of the pressure fluid when the log is halted to prevent advancing movement and when a predetermined pressure level has been reached in the cylinder.

Figure 9:
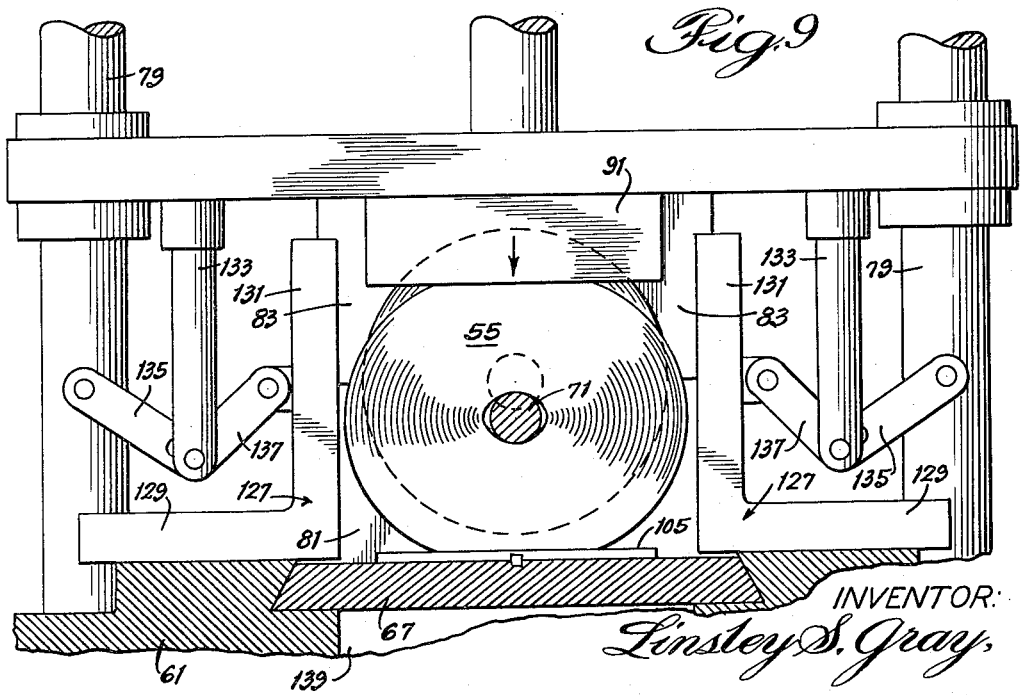
FIGURE 9 is a sectional view taken on the line 9—9 of FIGURE 5.

Separation of the endmost roll 55 from the log 33, subsequent to successive advancing log movement is accomplished through the operation of the log separating mechanism 27 which is located on the supporting structure 25 at the end of the carriage 31 in the direction of advancing log movement. The roll separating mechanism comprises generally a log clamping and end roll separating press unit 57 functioning in timed sequence with a chuck unit or tail stop 59 which provides support for the endmost roll during the separation operation, and which acts, under certain circumstances, to limit advancing movement of the log for proper positioning of the endmost roll within the press unit. As seen especially in FIGURES 4 through 9, both the press unit 57 and the chuck unit 59 are mounted on an upper plate 61 of the supporting structure 25.

The chuck unit 59 which supports the endmost roll during separation from the log comprises a member or shoe 63 which is movable toward and away from the carriage 31 by means of a fluid cylinder 65. The shoe 63 is formed with a forwardly extending foot 67 which is in sliding contact with the plate 61 and with a generally upright body section 69 carrying a mandrel 71 which is inserted in the central core of the endmost roll 55 incident to motion of the chuck unit toward the carriage prior to closing movement of the press unit 57.

After insertion of the mandrel 71 in the core of the endmost roll, the log is clamped and the endmost roll is than severed from the log incident to closing of the press unit. In this respect, the press unit 57 comprising a ram 73 which is movable toward and away from the plate 61 to effect the clamping and separation operations, and which is actuated by means of a fluid cylinder 75 (see FIGURE 2) supported in overlying relation to the ram 73 on a bridge 77 formed of channel members suitably secured to the supporting structure 27. Movement of the ram 73 relative to the plate 61 is guided by the action of a plurality of guide bars 79 (see FIGURES 1, 8 and 9) which extend upwardly from a fixed attachment to the plate 61, and through suitably bushed openings in the ram 73.

Clamping of the log prior to separation of the endmost roll is effected during the initial downward movement of the ram 73 through the vise action of an anvil 81 (see FIGURES 4 through 7) fixed to the plate 61 and an upper vise member 83 carried by the ram 73. Effective clamping engagement of the log between the anvil and upper vise member is obtained by forming both of these parts with a log facing surface of concave, semi-cylindrical formation and by the use of a pair of compression springs 85 which permit over travel of the ram relative to the vise member.

More specifically in this regard, the upper vise member 83 is carried by the ram 73 by means of a pair of rods 87 which extend upwardly from a fixed attachment with the vise member 83 through suitably bushed openings in the ram 73 and which are each provided at their upper ends with suitable means, such as a pin 89, to prevent downward disengagement of the vise member from the ram. One of the compression springs 85 is positioned around each of the rods 87 and is seated at each end in suitable counter-bores which are formed in the vise member and in the ram in surrounding relation to the rods and which provide room for the springs in their collapsed condition. Thus, as can be understood from FIGURES 4 and 5, when the ram is fully withdrawn, the springs 85 are fully extended and the vise member 83 is spaced from the log. As the ram begins to descend, the springs effect clamping engagement of the vise member with the log while permitting over travel of the ram so that when the ram is fully extended, the springs are collapsed. When the ram retracts, the clamping engagement with log is maintained until the upward ram movement approaches completion.

Separation of the endmost roll from the clamped log is effected incident to the continued downward movement of the ram which acts through a depending block 91 to deform the endmost roll from a generally circular shape to an elliptical shape having a major axis transverse to the application of the separating force and to downwardly displace the endmost roll relative to the log so as to break the bonds joining the endmost roll to the log. During this operation, the roll is supported by the chuck unit 57, as previously mentioned, with the mandrel 71 inserted in the core of the endmost roll.

As the ram descends, the block 91 engages the endmost roll to exert a downwardly directed pressure. This force is transmitted through the roll to the mandrel which is mounted to permit resilient downward movement in the direction of the applied separating force. Thus, the mandrel acts to hold the roll in general position, without diminishing the roll deforming effect produced incident to closing of the press unit ram 73.

As can be seen best in FIGURES 4 and 5, the mandrel 71 extends in a generally horizontal direction from within an elongated, vertically extending slot 93 in the body section 69 of the sliding shoe 63, and is biased toward the upper end of the slot 93 by means of a spring 95. Maintenance of the the spring in operational position is accomplished by locating its lower end in a bore 97 extending downwardly from the lower end of the slot and by seating its upper end in a recess 99 formed in the underside of the mandrel.

While movement of the mandrel along the line of direction of the separating force is permitted through the spring 95 and slot 93 arrangement just described, independent movement of the mandrel in a direction perpendicular to the body section 69 is precluded by means of a generally rectangular flange 101 which is formed at the rear end of the mandrel 71 in overlying relation to the rear surface of the body section 69, and which is enclosed by a bracket 103 having a vertically extending channel formation (see FIGURE 1) which prohibits rotation of the mandrel and assists in guiding its vertical motion. The bracket 103 also provides a convenient means by which the piston of the cylinder 65 is fixed to the sliding shoe to provide movement of the chuck unit incident to operation of the cylinder.

During the separating operation, the downward movement of the ram 73 causes the endmost roll to become seated on a slide 105 (see FIGURES 4 through 7) which is mounted on the foot 67 of the sliding shoe, and which acts as a bed against which the endmost roll is deformed from circular cross section to eliptical cross section incident to full downward extension of the ram.

The foot 67 is supported by the plate 61 and is formed with an upper inclined surface 107 along which the slide 105 is movable. The slide is generally of wedge shape, having an upper generally horizontally disposed face 109 which forms a bed against which the endmost roll is compressed to effect the desired roll deformation, an inclined face 111 which is in mating contact with the inclined surface 107 of the foot, and a generally vertical face 113 connecting the horizontal and inclined faces.

The slide 105 is secured to the foot for sliding movement along the inclined surface 107 by means of a pair of screws 115, each of which is formed with an enlarged head 117 and an intermediate cylindrical section 119. The screws 115 extend respectively through a pair of elongated slots 121 formed in the foot 67 and are threaded into the slide 105 so that the cylindrical sections 119 extend within the slots 121 and so that the heads 117 project laterally beyond the sides of the slots to permit relative sliding movement between the foot 67 and the slide 105, while at the same time preventing disengagement therebetween.

As seen particularly in FIGURE 6, the slide 105 is urged downwardly along the inclined foot surface 107 to a forward position by means of a pair of springs 123, one of which is located in each of the slots 121. Operational position of the springs 123 is maintained by locating the upper end of each spring in a recess 125 extending into the foot and by seating the lower end of each spring in a pocket formed through cooperation of the slots 121, screw heads 117 and the inclined face 111 of the slide 105.

Upward movement of the slide 105 along the foot 67 to the bed position shown in FIGURES 4 and 5 occurs incident to the forward chuck unit motion which also effects insertion of the mandrel into the core of the endmost roll. During this movement, the generally vertical face 113 of the slide comes into contact with the side of the anvil 81 to effect upward movement of the slide 105 against the action of the springs 123 until in the bed position which is seen in FIGURES 4 and 5, and which restricts downward displacement of the endmost roll and thereby cooperates with the ram to effect the desired deformation.

Thus, by the above described arrangement the downward stroke of the press unit ram 73 operates in cooperation with the supporting mandrel 71 and the bed-forming slide 105 to sever the bonds holding the endmost roll to the log by deformation and downward displacement of the endmost roll 55 relative to the log 31.

At the completion of the downward stroke of the ram 73, the endmost roll has been severed from the log, is held on the supporting mandrel 71, and is generally of elliptical formation. In this connection, another of the features of this invention is the provision for re-shaping or the re-forming of the severed roll to its original circular formation.

The re-shaping operation is accomplished by means of a pair of slide clamps 127 (see particularly FIGURES 8 and 9) which are seated on the plate 61 and which are arranged by means of toggle linkages for movement toward and away from each other incident to movement of the press unit ram. Each of the clamps 127 is of generally right angle formation having a leg 129 which is in slidable engagement with the plate 61 and having an upright clamping leg 131 which engages the severed roll.

The toggle linkages which effect movement of the side clamps 127 during operation of the press unit each include a rod 133 which is fixedly secured to the ram 73 in downwardly dependent relation and which is pivotally connected at its lower end to each of the pair of generally identical toggle links 135 and 137. One of these links 135 extends laterally to a pivotal connection with one of the guide bars 79 and the other link 137 extends in the opposed direction to a pivotal interconnection with the clamping leg 131 of the adjacent side clamp.

The described linkage arrangement provides for full retraction of the side clamps 127 when the ram 73 is also fully retracted and for movement of the side clamps toward one another as the press unit ram moves downwardly. Just prior to engagement of the block 91 with the endmost roll, the side clamps reach their maximum point of approach in a position in which they are barely in touching engagement with the endmost roll. From this position, as the ram 93 continues its downward stroke, the side clamps 127 begin to move outwardly until they again reach a retracted position when the ram is at dead bottom. Thus, as the endmost roll is deformed from a circular to an elliptical cross section under the influence of the descending ram 73 and the underlying slide 105, the side clamps 127 move apart to prevent interference with this operation.

Upon the upward stroke of the press unit ram 73, the side clamps 127 again move toward one another and this time engage the extended sides of the severed roll 55 to hold and to squeeze the elliptical roll along its major axis so as to return the roll to a substantially circular shape.

During this operation when the severed endmost roll is held by engagement with the side clamps, the chuck unit 59 begins to move rearwardly, thereby withdrawing the mandrel 71 from the core of the severed roll. Incident to this rearward chuck unit motion, the slide 105 moves downwardly along the inclined foot surface 107 under influence of the springs 123 to provide clearance for expansion of the severed roll in a downward direction as well as in an upward direction. Prior to return of the side clamps 127 to their closest point of approach during the upward stroke of the ram 73, complete retraction of the sliding chuck unit 59 is effected to thereby uncover a roll discharge opening 139 in the plate 61 (see FIGURE 6). Continued upward movement of the ram results once more in outward movement of the side clamps and effects release of the now reshaped severed roll for discharge from the roll separating mechanism 27 downwardly through the discharge opening 139 in the plate 61.

After release of the separated roll, the sliding chuck unit 59 moves rapidly to its forwardmost position prior to completion of the up-stroke of the ram and accompanying release of the log clamping vise. When the engagement of the upper vise member 83 and the log is discontinued incident to completion of the upward ram stroke, the force exerted on the log by the feed cylinder 23 again causes advancing movement of the log toward the chuck unit until engagement of the log against the body section 69 acts to arrest the advance of the log. Immediately subsequent, the press unit ram moves downwardly to effect clamping of the log and separation of the endmost roll.

As described thus far, advancing movement of the log is limited by engagement of the endmost roll with the chuck unit which, in the illustrated embodiment, provides a maximum incremental advance of three inches, and which allows for sequential separation of a log composed entirely of rolls of maximum uniform width. However, the disclosed equipment also incorporates means for selectively limiting the advance of the log to less than the maximum roll width to facilitate breaking of logs composed entirely of rolls having a uniform width or thickness less than maximum, or the breaking of logs comprised of rolls of various thickness, all less than the maximum width, three inches in this case.

The desired selective limitation of the log advancing movement is provided by an auxiliary clamp 141 (see particularly FIGURE 7) comprising a fluid cylinder 143 which is supported by a bracket 145 (see FIGURE 1) secured to the bridge 77 carrying the press unit cylinder 75. The auxiliary clamp fluid cylinder 143 includes a piston 144 formed at its lower extremity with a concave cylindrical surface for cooperation with the anvil 81 to engage and clamp the log therebetween and thereby overcome the advancing action of the log feed cylinder 23. Clamping operation of the cylinder 143 is controlled through a micro switch 147 (see FIGURE 3) which is mounted on the side of the log pusher leg 49 and which includes a contact finger 149 for moving engagement along a switch bar 151 removably positioned in the carriage adjacent the track 53 (see FIGURES 2 and 3). The switch bar 53 includes a plurality of trips or detents 153 which are spaced in reverse order in accordance with the width of the rolls comprising the log to be broken. Thus, as the log advances a distance equal to the width of the endmost roll, the finger 149 will come into contact with one of the trips 153 to actuate clamping operation of the auxiliary clamp fluid cylinder 143 and thereby arrest the log advancing movement. A suitable means (not shown) is also incorporated to release the auxiliary clamp incident to approaching completion of the upward ram stroke to thereby provide for continued incremental advance of the log. By use of the foregoing described arrangement, the disclosed apparatus may be effectively employed for automatic breaking of logs formed of any number of rolls which are of different widths less than the three inches maximum width and which are arranged in any desired order.

After severance from the log, the individual rolls are transported from the roll separating mechanism 27 of the log breaking portion to the core inserting portion of the disclosed roll manufacturing equipment where suitable core plugs are inserted in each end of the cores. As generally shown in FIGURE 10, the core inserting portion of the disclosed equipment includes a rotary indexing table 155, suitable means for delivering individual rolls to the indexing table from the roll separating mechanism, a sizing unit 157 which flattens the rolls in addition to sizing and aligning the core openings or eyes for subsequent insertion of the core plugs, a pair of automatically fed core plug inserters 159, and an arrangement for sorting and discharging of the rolls from the indexing table in accordance with their thickness.

When the severed rolls are released by the side clamps of the roll separating mechanism they fall through the discharge opening 139 in the plate 61 and are received in a chute 161 (see FIGURES 2 and 10) of channel cross section which delivers the individual rolls to a conveyor 163. This conveyor comprises an endless belt 165 which is trained about a pair of pulleys 167 driven by a suitable drive mechanism (not shown) and which is situated in upwardly inclined disposition to effect elevation of the rolls from the delivery end of the chute 161 to the mouth of a trough 169 leading to the index table 155. While traveling up the conveyor the individual rolls are maintained on the conveyor by a pair of spaced, generally longitudinally extending guides 171 and 173. One of the guides 173, as seen in FIGURE 10, is curved across the upper end of the conveyor to effect automatic discharge of the rolls into the mouth of the trough 169.

The trough 169 is also generally of channel formation and is inclined downwardly to provide for gravity movement of the individual rolls until engagement with an ear or flange 175 which extends upwardly from the lower end of the trough and which effects successive location of the rolls at a point adjacent the indexing table 155. Subsequently, the individual rolls are successively delivered off one side of the trough on to the indexing table by means of a loading ram 177 driven by an air cylinder 178 which operates in coordination with, and in response to, indexing of the table.

The indexing table 155 is carried by a frame (not shown) which supports suitable means for driving the indexing table. Formed on the upper surface of the table are several stations 179 for receiving the rolls. Each of these stations includes a central aperture 181 which affords passage of the tooling to be described for sizing and insertion of a core plug in the lower core opening. In addition, a pair of pins 183 are provided at each station for cooperation with other suitable means (not shown for purposes of clarity in illustration and description) to maintain the rolls in proper position relative to the table during travel of the table past the sizing unit 157 and the plug inserters 159.

As the indexing table rotates step by step, the loading cylinder 178 acts to successively position the rolls from the trough onto the table. The rolls thus positioned are first transported by the table to the sizing unit 157 which operates to align and size the upper and lower core openings for latter receipt of a core plug, as well as to flatten the rolls and thereby eliminate any undulation resulting from the separating and re-shaping operation. The sizing unit 157 comprises a press 185 including an upper head 187 and a lower bearing structure 189 having mounted therein an arbor 191 in alignment with the upper head. The press is positioned relative to the indexing table to locate the upper head and lower arbor in successive alignment with the center of the several roll bearing stations 179 incident to indexing of the table. Closing action of the press to obtain the desired roll flattening and core sizing is controlled by the indexing movement of the table to provide for initial downward movement of the upper head 187 and subsequent upward movement of the arbor 191.

The upper head 187 is formed with a lower generally flat face 193 which engages the upper surface of the roll to flatten the roll and to hold the roll firmly against the indexing table during the subsequent upward movement or the lower arbor. Located centrally on the face 193 is a button 195 which is designed for insertion within the core to properly size the upper eye prior to introduction of the core plug. As seen, the button 195 is preferably formed with a predetermined height of approximately ¼ inch which determines the depth of penetration within the core and is provided with a tapered lead-in to permit initial entry of the button into the core opening notwithstanding any out-of-round condition not fully corrected by the re-shaping operation.

The accommodation by the press 185 of rolls of various widths, as received from the roll separating mechanism, is facilitated by driving the upper head 187 through a fluid cylinder, either hydraulic or pneumatic. In this regard, the cylinder is provided with a by-pass valve which diverts the pressure fluid after a predetermined pressure value somewhat in excess of the operating pressure required to effectively insert the sizing button 195 in the upper core opening, to flatten the roll, and to provide a restraining pressure which holds the roll against upward movement during the sizing stroke of the lower arbor.

After the downward stroke of the upper head 187 is completed, and when the roll is held securely between the head and the indexing table, the core sizing operation continues by insertion of the upper end of the arbor 191 through the indexing table aperture 181 and into the lower eye of the core. The upper end of the arbor 191 is formed in a fashion similar to the button on the upper head and also travels a predetermined fixed distance of approximately ¼ inch into the lower core opening.

Movement of the arbor is guided by the bearing structure 189 which, as seen in FIGURE 11, extends between the bed 197 of the press 185 and the lower surface of the indexing table 155. The bearing structure 189 comprises generally a sleeve 199 which is bolted or otherwise suitably secured to the press bed 197 and which has affixed thereto a lower collar 201. Guidance of the arbor through the bearing structure is effected by a pair of bushings 203 and 205 one of which 203 is affixed in the upper end of the sleeve 199 and the other of which 205 is located in the lower collar 201. Operation of the arbor 191 is provided through a linkage including a rocker arm 207 and a link 209 actuated by the press in predetermined time sequence with the movement of the upper head 187. The rocker arm 207 extends through a suitable elongated opening 211 in the side wall of the sleeve 199 and is joined to the arbor through a slotted pin connection indicated at 213 which affords conversion of the rocking movement of the arm into linear arbor movement.

When the sizing operation is completed, the individual rolls are successively transported by the indexing table to a position in alignment with the pair of plug inserters 159 which place a plug within each end of the core. While various types of plugs may be readily employed to provide free roll rotation in a tape dispenser, the present disclosure is particularly designed to effect the insertion of a generally cylindrical, metallic plug 213. As shown particularly in FIGURE 12, the plugs 213 are formed with a central aperture 215, a circumferential groove 217 which aids particularly in feeding of the plugs to the inserters, and a tapered lead-in 219 which contributes materially to trouble-free operation of the automatic equipment.

The plug inserters 159 are supported by the indexing table frame above and below the indexing table in aligned relation with one another and with the center of the respective roll bearing stations when positioned by indexing movement between the inserters. The structure and operation of the upper and lower plug inserters 159a and 159b, respectively, are generally idenitcal except that the lower inserter 159b is inverted and that the inserting movement of the lower unit is retarded until after completion of the downward stroke of the upper inserter so as to facilitate holding of the roll on the indexing table by the upper inserter during insertion of the lower core plug. Each of the core inserters 159 includes generally a fluid cylinder 221 with a moving ram 223 having attached at the outer end thereof a head 225 which holds the metal plugs 213 in releasable engagement during the inserting operation and which includes a button 227 adapted for introduction within the plug aperture 215 and a pair of permanent magnets 229 positioned to provide a magnetic field which is effective to maintain engagement with the plug until seated in the core. Of course, the plugs can be held on the heads by means other than permanent magnets but as metal plugs are employed in this particular embodiment the use of a magnetic has been found to be effective. The upper head 225a also includes a platen 231 which is adapted to engage the upper surface of the roll and hold the roll during insertion of the lower core plug.

The core plugs 213 are automatically fed to the inserters 159 by a pair of core plug feeding units 233 (see FIGURE 10), each of which is mounted by means of an adjustable bracket fixed on the frame of the press 185 and each of which includes an automatic hopper 235 which feeds the plugs into the upper end of a delivery track 237 along which the plugs travel toward a delivery station 239 at the lower end of the track. In the delivery station, the plugs are successively held in releasable aligned position with the head of the associated inserter through the cooperation of a plurality of spring biased plungers 241 which engage the central groove 217 of the plug and which are carried on two or more brackets 243 (one of which is shown in FIGURE 12) extending from the adjacent fluid cylinder.

Indexing movement of the table 155 to position a sized roll between the plug inserters 159 also actuates the operation of the cylinders which control the movement of the inserting heads. In this regard, just after the start of the downward movement of the upper inserter head 225a, it passes through the associated delivery station 239 to engage and withdraw one of the core plugs 213. Continued downward movement effects insertion of the plug within the upper eye of the core and brings about engagement of the platen 231 with the upper face of the roll. The cylinder 221a which drives the upper inserter head incorporates a pressure fluid by-pass arrangement similar to that of the sizing unit 157 so that when the pressure exerted by the platen 231 against the roll reaches a predetermined pressure, the operating fluid is diverted. While other means may also be effectively utilized, diversion of the pressure fluid acts to initiate operation of the cylinder 221b to move the lower inserting head 225b upwardly through the adjacent delivery station 239 to thereby engage and withdraw a plug, and upon continued movement, to introduce the plug within the lower eye of the core.

Subsequent to the plug inserting operation the rolls are selectively discharged from the indexing table 155 in a manner affording automatic sorting of the rolls in accordance with their thickness. This feature is achieved incident to the continued rotation of the indexing table by means of a series of blades 243 which are suitably supported at a point spaced from the indexing table and which extend inwardly of the table with the lower edge of each blade fixed at a predetermined constant height above the table and with the blades arranged so that the height of the blades above the table decreases in the direction of rotation of the table. Thus, as the table rotates, any given roll will pass under those blades fixed at a height greater than the thickness of the roll and will eventually engage a blade which is spaced from the table a distance less than the thickness of the roll for cammed movement off the table into a suitable receptacle. While the illustrated apparatus incorporates only a pair of such blades, it is apparent that the number of blades and resultant degree of discrimination between rolls of different thicknesses is limited only by the space available on the face of the indexing table.

The integrated roll handling equipment described above provides for the elimination of center cores of prescribed length in a log of rolled tapes, the automatic separation of such rolls from the log, and for subsequent insertion of a uniform size core plug in each end of the respective cores of the separated rolls irrespective of the width of such rolls. As explained, the illustrated equipment is also designed to include provision for breaking logs composed of rolls of various widths and for receiving the separated rolls for aligned sizing of the cores, insertion of the core plugs, and finally, for sorting of the rolls according to their thickness.

Numerous changes and modifications may be made in the present disclosure to achieve certain of the features mentioned herein without departing from the principles of the present invention. Various features of the invention are set forth in the claims.

I claim:

1. The method of manufacturing rolled tapes which are simultaneously formed from a single web and wherein adjoining rolls are at least partially interleaved so as to be initially joined together in a log having a hollow core, said method comprising the steps of deforming the endmost roll to effect severance of the endmost roll from the remainder of the log, substantially re-establishing the original shape of the several roll, sizing the core openings on each side of the severed roll, and inserting a core plug in each of the sized openings.

2. The method of manufacturing a plurality of tape rolls which are of various widths and which are initially joined together in a log having a hollow core, such joinder of the rolls being due at least in part to interleaving of adjoining tapes during the winding thereof, said method comprising the steps of incrementally advancing the log for predetermined distances in accordance with the width of the successive rolls in the log, separating the successive endmost roll from the log incident to each incremental advance to thereby expose the next roll in endmost relation to the log, said separation of the endmost rolls being individually effected by simultaneously deforming and displacing the endmost roll relative to the remainder of the log, substantially re-establishing the original shape of the separated roll, aligning and sizing the core openings on each side of the severed rolls, inserting a core plug in each of the aligned sized openings, and sorting the rolls according to width.

3. The method of manufacturing tape rolls which are initially joined together in log form, such joinder of the rolls being due to at least partial interleaving of adjoining tapes as they are simultaneously wound into roll form, said method comprising the steps of deforming the endmost roll relative to the log to effect disconnection of the endmost roll from the log, and then substantially re-establishing the original shape of the separated endmost roll.

4. Apparatus for manufacturing tape rolls which are initially joined together in a log having a hollow core, such joinder of the rolls being due to at least partial interleaving of adjoining tapes as they are simultaneously wound into roll form, said apparatus comprising means for sequentially advancing the log in the axial direction along a predetermined path, means adjacent a portion of said path operable to successively deform the endmost roll relative to the remainder of the log to thereby effect separation of the endmost roll from the log, means operable to substantially re-establish the original shape of said endmost roll after it is separated from the log, means for transporting the separated rolls along a second predetermined path, means adjacent a first portion of said second path for sizing the hollow core of the separated rolls for receipt of a core plug, and means adjacent a second portion of said second path for inserting a core plug in the hollow core of the separated rolls.

5. Apparatus for manufacturing gummed-tape rolls of various widths which are initially joined together in a log having a hollow core, such joinder of the rolls being due to at least partial interleaving of adjoining tapes as they are simultaneously wound into roll form, said apparatus comprising means for sequentially advancing the log in the axial direction along a predetermined path, means adjacent a portion of said path for successively arresting movement of the log in accordance with the width of the endmost roll, means adjacent another portion of said path for successively deforming the endmost roll relative to the remainder of the log incident to each advance of the log to effect separation of the endmost roll from the log and to expose the next roll in endmost relation to the log, said last mentioned means also being operable to substantially re-establish the original shape of the separated rolls, means for transporting the separated rolls along a second predetermined path, means adjacent a first portion of said second path for aligning and sizing each of the ends of the hollow core of the separated rolls for receipt of a core plug, means adjacent a second portion of said second path for inserting a core plug in each end of the hollow core of the separated rolls, and means adjacent a third portion of said second path for sorting the separated rolls according to width.

6. Apparatus for breaking a log constituting a plurality of individual tape rolls which are joined together due to at least partial interleaving of the adjoining tapes during the formation of the log, said apparatus comprising means for moving the log axially through a predetermined path, and means adjacent a portion of the path for successively deforming the endmost roll relative to the remainder of the log to effect separation of the endmost roll from the log.

7. Apparatus for breaking a log constituting a plurality of tape rolls which are joined together due to at least partial interleaving of the adjoining tapes during the formation of the log, said apparatus comprising means for incrementally advancing the log axially through a predetermined path, and means adjacent a portion of the path for deforming the endmost roll relative to the remainder of the log incident to each incremental advance to effect separation of the endmost roll from the log and to expose the next succeeding roll in endmost relation to the log, said last mentioned means also being operative to substantially re-establish the original shape of the separated rolls.

8. Apparatus for sequentially separating the endmost roll of a series of rolls of gummed-tape which are of various widths and which are joined together by at least partial interleaving of adjoining tapes to constitute a log of such rolls, said apparatus comprising means for advancing the log in the axial direction step-by-step through a predetermined path, means for determining each increment of advance in accordance with the widths of the rolls constituting the log, and means adjacent a portion of the path for successively deforming the endmost roll relative to the remainder of the log to effect separation of the rolls.

9. Apparatus for breaking a log constituting a plurality of tape rolls of various widths which are joined together by interleaving of the tapes as they are simultaneously wound into roll form, said apparatus comprising means for moving the log axially through a predetermined path, means for arresting movement of the log in accordance with the order and width of the rolls in the log, and means adjacent a portion of the path for successively deforming the endmost roll relative to the remainder of the log to effect separation of the endmost roll from the log and for substantially reestablishing the original shape of the separated rolls.

10. Apparatus for severing the endmost roll from a series of rolls of gummed tape constituting a log of such rolls which are joined together by interleaving of the tapes as they are simultaneously wound into roll form, said apparatus comprising means for clamping the log in fixed position, means for applying radially directed pressure to the endmost roll so that the endmost roll is deformed relative to its original shape and displaced relative to the log incident to the deformation of the endmost roll to thereby effect disconnection of the endmost roll from the remainder of the log, means for supporting the roll during the application of said deforming pressure, and means for applying and then releasing pressure in a direction generally perpendicular to the direction of application of the deforming pressure to engage the separated roll, to substantially re-establish its original shape, and to subsequently release the separated roll.

11. Means for supporting a roll of tape formed with a hollow core during the application of a radially directed force against the roll, said means comprising a frame, a mandrel mounted by said frame for insertion within the hollow core of the roll, said mounting affording resilient displacement of said mandrel in the direction of the radially applied force, said frame being formed with a foot having a surface inclined with respect to the direction of application of the radially applied force, and a slide carried by said foot along said inclined surface and having a surface disposed generally perpendicular to the direction of the radially applied force, said slide being movable along said inclined surface between a position wherein said slide surface constitutes a bed against which the roll is compressed incident to the application of the radially directed force, and a position disposed at an increased distance from said mandrel.

12. Means for deforming the endmost roll of a log comprised of such rolls to effect separation of the endmost roll from the log and for re-establishing the original form of said endmost roll, said means comprising a frame having a portion thereof constituting a bed, a ram carried by said frame for movement toward and away from said bed, a pair of side clamps slidably carried on said bed in opposed relation to one another for movement toward and away from one another in a direction generally perpendicular to the direction of movement of said ram, a linkage connecting said ram and said side clamps, and means for supporting a log of such rolls with the endmost roll located between said ram and said bed and intermediate of said side clamps, said ram being movable downwardly from a retracted position spaced from the log to a bottom position to effect separation of the endmost roll from the log and being movable upwardly from said bottom position to effect reshaping of the separated roll by said side clamps, said side clamp being movable incident to the stroke of said ram from a retracted position to a position of closest point of approach and then to a retracted position whereby initial downward movement of said ram from its retracted position first effects closing movement of said side clamps to their closest point of approach and then simultaneously effects outward movement of said side clamps to a retracted position and separation of the endmost roll from the log by deformation of the endmost roll from a generally circular cross section to a generally elliptical cross section, and whereby initial upward movement of said ram effects engagement of said side clamps with said separated roll to re-establish the original form of of said separated roll incident to the movement of said side clamps toward their closest point of approach, and whereby continued upward movement of said ram effects subsequent opening of the side clamps to disengage the separated roll held therebetween.

13. Apparatus for sizing and inserting plugs in the cores of hollow, gummed-type rolls of various thicknesses, said apparatus comprising a rotary indexing table having a plurality of roll receiving stations thereon, means adjacent said table for successively loading a roll onto each of said stations incident to indexing of said table, a press located adjacent said table and having an upper head and a lower arbor in alignment with the center of each of said stations as said stations are indexed past said press, said press being located in spaced relation to said loading means in the direction of rotation of said table, said upper head and lower arbor being movable toward said indexing table to effect sizing of the core of a roll located therebetween on one of said stations, said upper head downward movement being prior to the upward movement of said lower arbor to maintain the roll on said table during action of the lower arbor, a pair of plug inserters located adjacent said table in spaced relation in the direction of rotation of said table from said press and being vertically spaced above and below said indexing table in alignment with the center of each of said stations as said stations are indexed past said inserters, each of said inserters including a head movable toward said indexing table for insertion of a plug in the core of a roll located therebetween on one of said stations, said upper inserter head downward movement being prior to the upward movement of said lower inserter head so as to maintain the roll on said indexing table during insertion of a core plug by the lower inserter, means for automatically delivering plugs to each of said inserters, and a series of blades for effecting discharge of the rolls from said table incident to table indexing movement, said blades being located in spaced relation to said inserts in the direction of rotation of said table, in spaced relation to one another, and in outwardly directed, spaced overlying relation to said table with the height of each blade above the indexing table being constant and with the height of each of the blades decreasing in the direction of rotation of said indexing table so as to afford automatic sorting of the rolls according to thickness incident to discharge of the rolls from the table.

References Cited in the file of this patent

UNITED STATES PATENTS

| | | |
|---|---|---|
| 1,284,312 | Glover | Nov. 12, 1918 |
| 2,701,638 | Petro | Feb. 8, 1955 |
| 2,742,965 | Drummond | Apr. 24, 1956 |
| 2,821,301 | Montague | Jan. 28, 1958 |

UNITED STATES PATENT OFFICE
CERTIFICATE OF CORRECTION

Patent No. 2,998,134            August 29, 1961

Linsley S. Gray

It is hereby certified that error appears in the above numbered patent requiring correction and that the said Letters Patent should read as corrected below.

Column 1, line 51, for "chaaracterized" read -- characterized --; column 9, line 40, after "magnetic" insert -- head --; column 10, line 54, for "several" read -- severed --; column 13, line 15, strike out "of", second occurrence; column 14, line 18, for "inserts" read -- inserters --.

Signed and sealed this 13th day of February 1962.

(SEAL)
Attest:

ERNEST W. SWIDER
Attesting Officer

DAVID L. LADD
Commissioner of Patents